US011068443B2

(12) United States Patent
Dongieux

(10) Patent No.: US 11,068,443 B2
(45) Date of Patent: Jul. 20, 2021

(54) INFORMATION DELETION ASSURANCE SYSTEM USING DISTRIBUTED LEDGER

(71) Applicant: Raynor Dongieux, Denver, CO (US)

(72) Inventor: Raynor Dongieux, Denver, CO (US)

(*) Notice: Subject to any disclaimer, the term of this patent is extended or adjusted under 35 U.S.C. 154(b) by 0 days.

(21) Appl. No.: 17/066,212

(22) Filed: Oct. 8, 2020

(65) Prior Publication Data

US 2021/0182240 A1 Jun. 17, 2021

Related U.S. Application Data

(60) Provisional application No. 63/035,077, filed on Jun. 5, 2020, provisional application No. 62/948,008, filed on Dec. 13, 2019.

(51) Int. Cl.
*H04L 7/02* (2006.01)
*G06F 16/16* (2019.01)
*G06F 9/54* (2006.01)
*H04L 9/06* (2006.01)

(52) U.S. Cl.
CPC ............ *G06F 16/162* (2019.01); *G06F 9/542* (2013.01); *G06F 9/547* (2013.01); *H04L 9/0643* (2013.01); *H04L 2209/38* (2013.01)

(58) Field of Classification Search
CPC ........ G06F 16/162; G06F 9/542; G06F 9/547; H04L 9/0643; H04L 2209/38
See application file for complete search history.

(56) References Cited

U.S. PATENT DOCUMENTS

| 10,333,694 | B1 | 6/2019 | Hu et al. | |
|---|---|---|---|---|
| 10,616,324 | B1* | 4/2020 | Kaddoura | ............... H04L 43/04 |
| 2014/0372751 | A1 | 12/2014 | Silverstone | |
| 2019/0018717 | A1* | 1/2019 | Feijoo | ................. H04L 67/2823 |
| 2019/0156336 | A1 | 5/2019 | Kasthuri | |
| 2019/0179801 | A1 | 6/2019 | Jang et al. | |
| 2019/0342078 | A1 | 11/2019 | Li | |
| 2019/0370250 | A1* | 12/2019 | Tipton | ................. G06Q 20/401 |
| 2020/0034553 | A1* | 1/2020 | Kenyon | ................ H04L 9/3239 |
| 2020/0044859 | A1* | 2/2020 | Srivastava | ............ H04L 9/0894 |
| 2020/0159697 | A1* | 5/2020 | Wood | ..................... G06F 16/162 |
| 2020/0226268 | A1* | 7/2020 | Zlotnick | ............... G06F 21/602 |
| 2020/0313856 | A1* | 10/2020 | Basu | ................... H04L 63/0823 |

OTHER PUBLICATIONS

International Search Report completed by the Korean Intellectual Property Office dated Feb. 9, 2021 for application PCT/US2020/056521.

* cited by examiner

*Primary Examiner* — Doon Y Chow
*Assistant Examiner* — Abdou K Seye
(74) *Attorney, Agent, or Firm* — Holzer Patel Drennan

(57) ABSTRACT

The technology disclosed herein facilitates the providing assurance for deletion of information from client systems using a distributed ledger network. One or more implementations disclosed herein provide using a user interface (UI) client to allow users to upload and delete information and a rest application programming interface (API) communicatively connected to the distributed ledger network logs the uploading and/or deletion of the information.

20 Claims, 9 Drawing Sheets

INFORMATION DELETION ASSURANCE SYSTEM USING DISTRIBUTED LEDGER

CROSS REFERENCE TO RELATED APPLICATIONS

This application is a non-provisional application based on and claims benefit of priority to U.S. patent application No. 63/035,077 filed on Jun. 5, 2020, entitled "INFORMATION DELETION ASSURANCE SYSTEM USING DISTRIBUTED LEDGER" and U.S. patent application No. 62/948,008 filed on Dec. 13, 2019 and entitled "INFORMATION DELETION ASSURANCE SYSTEM USING DISTRIBUTED LEDGER," both of which are incorporated herein by reference in their entireties.

SUMMARY

The technology disclosed herein facilitates the providing of assurance for deletion of information from client systems using a distributed ledger network. One or more implementations disclosed herein provide using a user interface (UI) client to allow users to upload and delete information and a rest application programming interface (API) communicatively connected to the distributed ledger network logs the uploading and/or deletion of the information.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTION

With the proliferation of user data and data sharing between various vendors, it has become paramount that user data is properly controlled. To ensure users' control over data, various regulations have been introduced by governing bodies. For example, the general data protection regulation (GDPR) adopted by European Union requires various vendors that collect the data to affirmatively assure the users that their data is deleted within a predetermined time-period upon user request. These and other regulations impose undue burden on small vendors that may not have the tools and infrastructure to provide such assurances. Furthermore, having a third party curate the transactions adds an element of "assurance" to the data curation and deletion process that is relevant regardless of the size of the companies/vendor using the information deletion assurance system (IDAS) disclosed herein.

The information deletion assurance system disclosed herein provides an infrastructure that can be used by various parties to provide information deletion assurance to each other. Specifically, the information deletion assurance system disclosed herein uses a distributed ledger network, such as a blockchain, to provide information deletion assurance between various parties.

Figure 1:
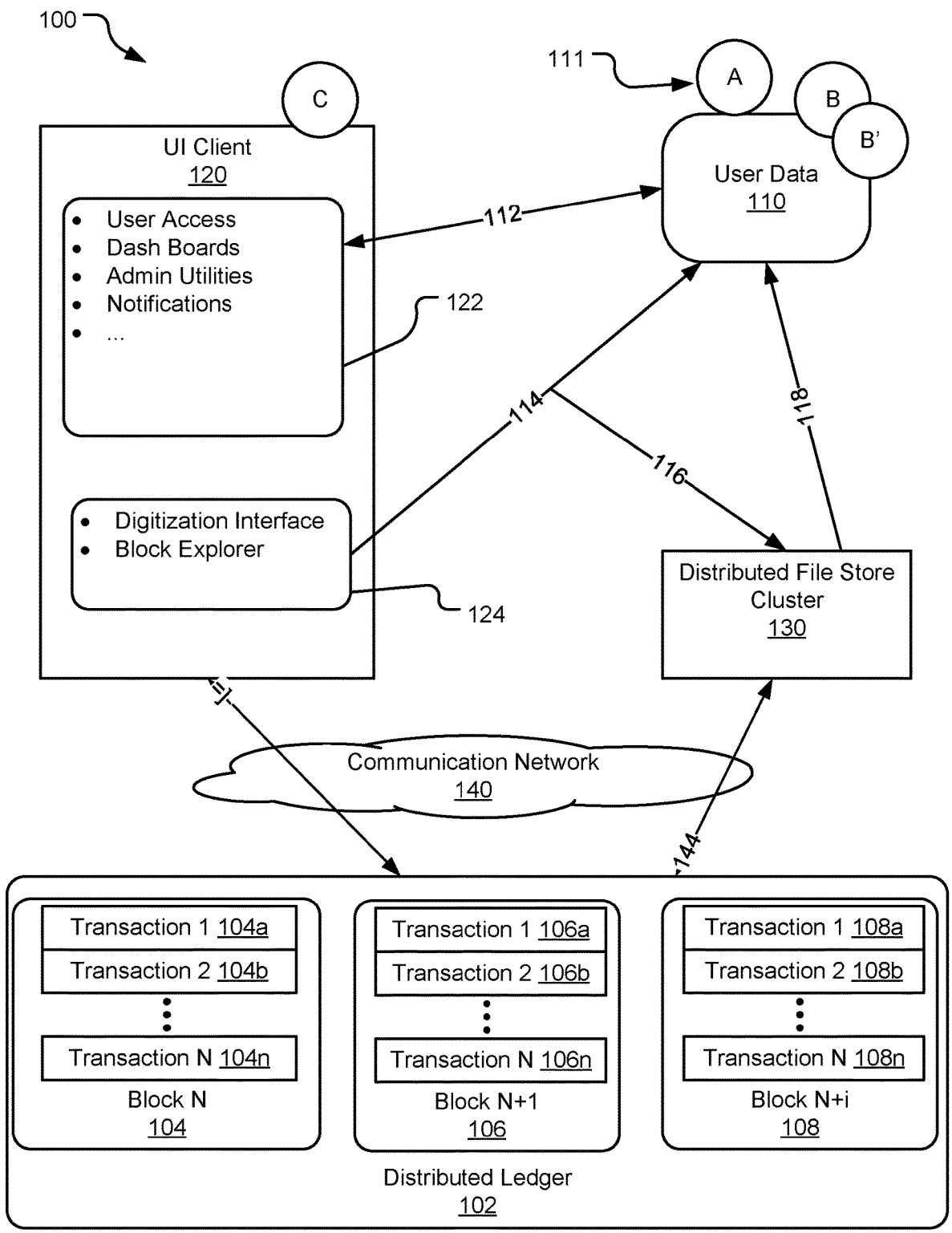
FIG. 1 illustrates an example block diagram of an implementation of the information deletion assurance system using an example distributed ledger.

FIG. 1 illustrates a block diagram 100 of an implementation of the information deletion assurance system using an example distributed ledger (DL). Specifically, user data 110 describes the storage of both raw unfiltered user data uploaded by authorized users and parallel user data sets composed of pseudonymized data that will remain for analysis after deletion protocols have been processed by the IDAS (Information Deletion Assurance System). As discussed herein, "User Data" is understood to be any media type not just text related to authorized users' identities if that data is defined as "personal" by the terms of service (TO S) agreed upon by the interested parties. A DL 102 may be any variation of a DL system that provides state of the art cryptographic hashing functions, smart contracts, and the overall ability to execute specialized chain code within the IDAS. An example of the DL 102 is a blockchain database. Another example, of the DL 102 is a hyperledger.

Alternatively, the DL 102 may be configured in a different format, such as a directed acyclic graph, a chain of transactions, etc. In the illustrated implementation, the DL 102 includes a number of blocks that include a number of validated transactions related to the IDAS 100. A block N 104 includes transaction 1 to transaction N and a block N+1 106 includes transaction 1 to transaction N. The blocks (e.g., the block N 104 and the block N+1 106) may include other data and metadata, such a previous hash, a nonce, a Merkle root, date, time node software version, etc.

A hyperledger is one variation of an immutable ledger that will log every Creation, Update, Access, Read & Delete to programmatically implement the stated rules & chain code (smart contracts) and keep track of such actions the for the final deletion consensus in which all copied instances of data flagged for deletion are overwritten & deleted. Data flagged for deletion by the IDAS is not considered deleted until all instances of that data have been through the chain code algorithm and final consensus of the deletion confirmation is reached. The DL 102 may include a large number of nodes or blocks such as blocks 104, 106 where each block stores a large number of transactions. For example, the block 104 stores transactions 104a, 104b, . . . and block 106 stores transactions 106a, 106b, etc.

A communication network 140 may facilitate communication between various components of the IDAS 100. In one implementation, the communication network 140 may be a public IP to Private IP secure socket layer connection for transactions between application code and their services application interface. This includes but is not limited to HTTP(s), web socket, TCP/UDP, custom peer to peer protocols, etc.

In some example implementations, nodes may be implemented in various types. For example, a full ledger node is a node that stores a substantially complete copy of the DL 102. A validation node is a node that may validate and approve transactions and/or blocks for inclusion in the DL 102. A contributor node is a node that contributes transactions for validation on the DL 102. A consumer node is a node that may consume and verify transactions on the DL 102. It should be understood that other types of nodes are contemplated.

The DL 102 may be implemented as a private (permissioned) ledger, a hybrid private/public ledger, or a fully public ledger. A private ledger is a ledger where each node supporting the ledger is authenticated or authorized to use the ledger. Furthermore, a private ledger may not be publicly visible or accessible by some nodes or outside parties. In a public DL, the full DL 102 is distributed publicly to many nodes and is accessible to all nodes in the network. Each node supporting the ledger includes a cryptographic identity, which may comprise a public/private key pair.

The IDAS 100 also includes a distributed file store cluster 130 which may be any variation of a distributed cluster storage that is scalable and definable in multiple variations. An implementation of the distributed file store cluster 130 may include servers and devices from all interested and authorized parties to the IDAS 100. The distributed file store cluster 130 is also understood to be both cloud-based and non-cloud based. The users A, B, B', etc., referred to by 111, may be configured as nodes and master nodes that may be deployed to function as both a node of account for the DL and also as a data storage unit are determined by the specific needs of the A←---→B transactional relationship and can evolve at any point during the transaction life of the TOS between A←---→B and ALSO $3^{rd}$ party curator C as defined by the applicable terms of service (TOS).

In one implementation, UI 120 is used in the initiating of view/share/unshare transactions, further described below in FIGS. 6A-6D. These include permission capabilities which define Super Admin or Sub Admin status, in both initiating chaincode commands and transactions and manual view/share/unshare actions. Specifically, the view function may be both a chaincode event and a non-chaincode event. Once the initial view of a file is logged to the DL, the liability for the deletion of that file has already been transferred and after that all further view actions may no longer be needed to be pushed to the DL as they are redundant and inefficient as 100% of the liability from the view of that file has already happened and has been logged to chaincode. In one implementation, subsequent views of the same file may be pushed to user database for logging of the data/metadata.

In yet another implementation, the user data 110 may be an internal system data such as a customer relation management (CRM) system data or content management system. A private third party systems' data such as a CRM provides a plugin mechanism for which the user data outer t and pseudo data anonymization algorithm can be implemented through.

A UI client 120 may be configured to provide all necessary user interface tools to initialize, carry out, and confirm the TOS between all authorized users of the IDAS. The UI Client is infrastructure provided by company C for the communication and sharing of information between A, B, B', B", etc. In one implementation, the UI Client 120 is also used in the initiating of deletion requests and the carrying out of manual deletion protocol. It also provides each user with organized presentations of transactions, deletion requests, deletion confirmations, as well any private message communications between interested parties. Alternatively, the UI client 120 also provides the necessary encryption functions needed to provide secure uploading and data hashing for the delivery to the DL 102, the User Data 110 and the distributed file store cluster 130.

Figure 2:
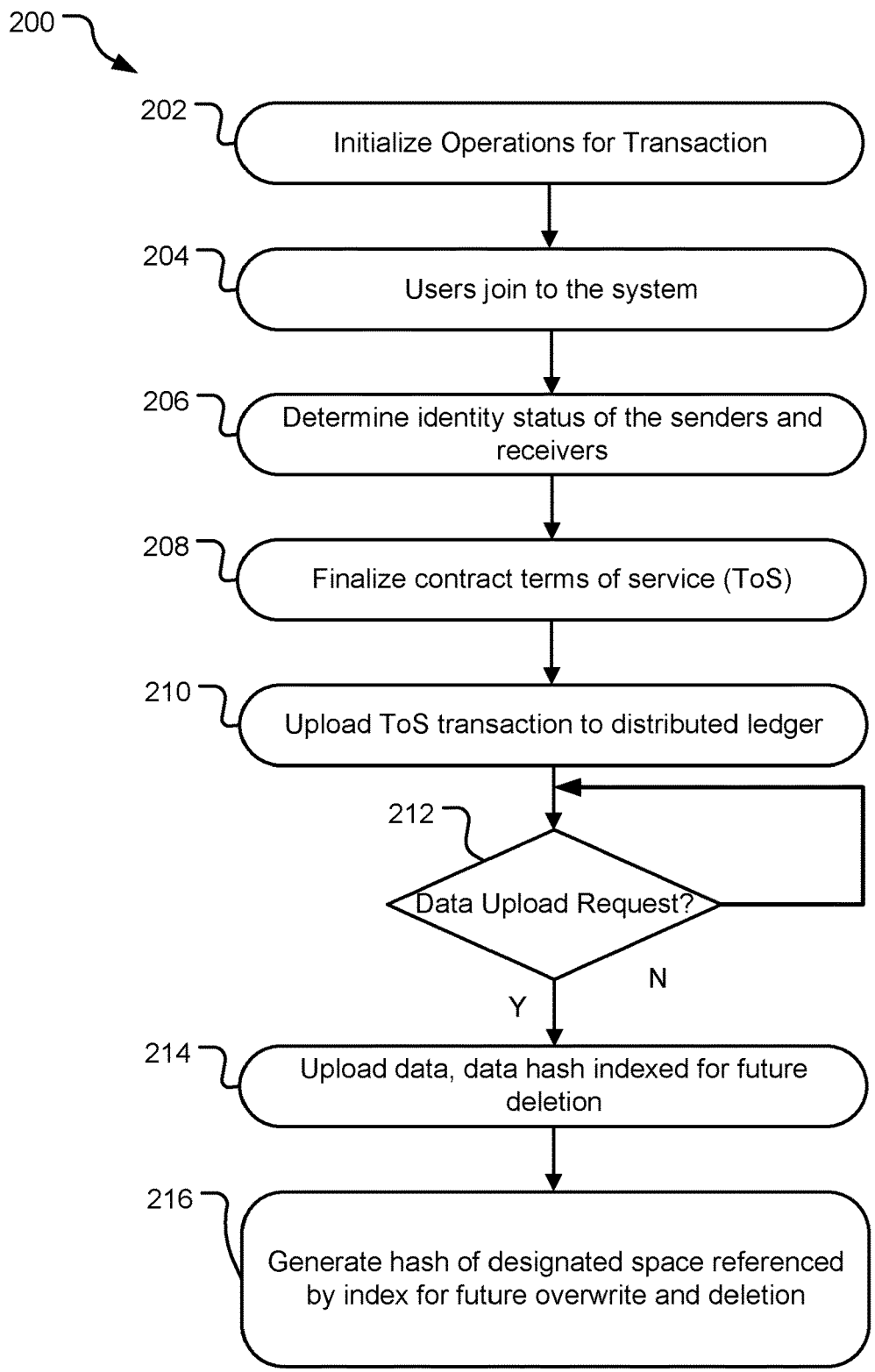
FIG. 2 illustrates example operations of the system using distributed ledger, such as a blockchain, to establish a system for secure uploading of the data.

FIG. 2 illustrates operations 200 of the system using DL, such as a blockchain, to establish a system for secure uploading of the data. An operation 202 initializes an operation for generating a transaction. An operation 204 allows users to join the IDAS 100. For example, the users 111 may join the IDAS 100 at operation 204. These users 111 may participate in the IDAS as senders and receivers of data, data requests, etc. Subsequently, an operation 206 determines identity status of senders and receivers in the IDAS 100. The identity status of such senders and receivers may include user names, user emails, users' computing device information, etc. The contract and terms of service (ToS) between various senders and receivers may be finalized at an operation 208. The ToS may specify various data deletion and verification policies and service level agreements. The finalization of the contract and ToS may include one or more of the senders and the receivers executing documents in electronic or other format and exchanging the executed documents. An operation 210 generates and uploads a ToS transaction to the DL. Such uploading of the ToS transaction may further include generating a hash based on the ToS transaction, including the transaction document and one or more metadata related to the ToS. An operation 212 determines if a data upload request is received. Specifically, the operation 212 may relate the data upload request with the related ToS.

If so, an operation 214 uploads the data and hash of the data indexed for future deletion to various nodes, such as nodes 104, 106 of the DL. Also, an operation 216 generates a hash of the designated space referenced by the index for future overwrite and/or deletion and such hash may also be stored on the various nodes of the DL. In one implementation, the deletion operation may comprise first overwriting the data and then deleting that overwritten data. Including an overwriting before deletion adds an additional layer of security of deletion assurance. Subsequently at 216, the deletion operation is validated and a transaction including hash of the validation is generated.

Figure 3:
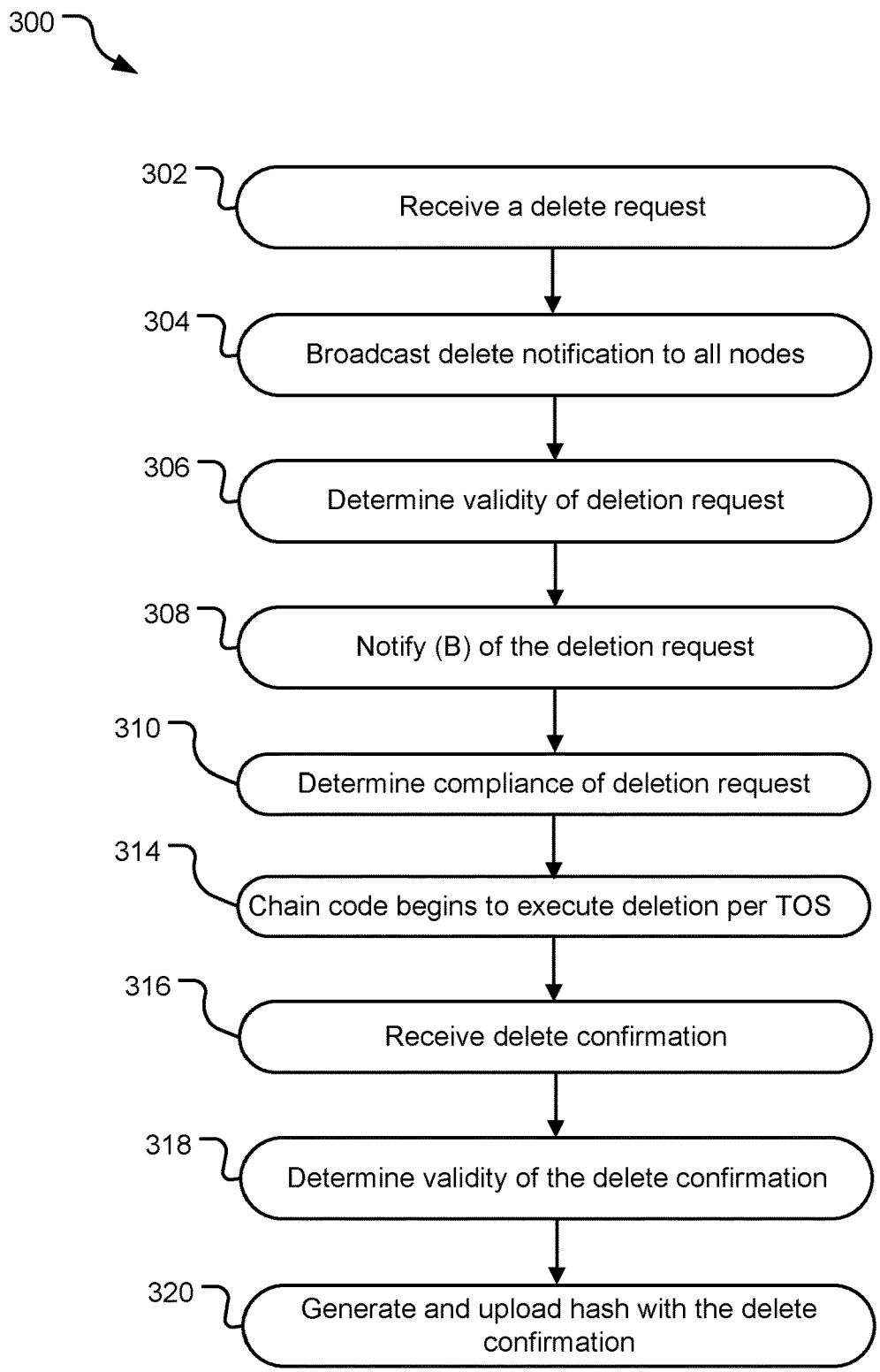
FIG. 3 illustrates example operations of the system using distributed ledger, such as a blockchain, to provide for secure deletion of the data.

FIG. 3 illustrates operations 300 of the system using DL, such as a blockchain, to provide for secure deletion of the data. An operation 302 receives a delete request. For example, the delete request may be received from one of the users 111. In response, an operation 304 broadcasts the delete request to various nodes of the DL. An operation 306 determines validity of deletion request by all nodes verifying that consensus can be made. Such verification of the deletion request may include the implementation of peer nodes specifically designed to process blocks of ordered and broadcasted transactions from operation 304. These peer nodes check the correctness of the ordered results including checking endorsement policy defined by chaincode, possible "double spending", syntax errors, and the overall correctness of the consensus block presented to them by the ordering nodes tasked with organizing consensus. These peer nodes tasked with consensus validation then update the distributed network database with the most current state of the ledger. The transactions generated by deletion requests may also include accompanying metadata that is generated by those transactions to specify and differentiate deletion requests from other transactions. This metadata is also validated by the DL as stated and facilitates an auditable trail into "human readable" form. Once the deletion request is verified, an operation 308 notifies flagged user, such as a user 111 B, B', B" etc., of the deletion request. A node is not "notified" via the UI Client unless they are a directly flagged recipient of the deletion request. Thus, for example, the operation 308 is a description of activity happening primarily at the UI Client level, such as the UI client 120. An operation 310 determines the compliance of the deletion request with the deletion TOS. For example, determining such compliance of the deletion request with the deletion TOS may include ensuring that the party initiating the deletion request has the authorization to do so and that the deletion request in consistent with one of more terms of the TOS.

At operation 314, a chaincode begins to execute deletion per TOS. The chaincode may be stored at various locations and on various nodes as needed and defined by the implementation of the chaincode business logic. "Chaincode" is code and business logic that defines the objects or "assets" within the distributed network and transaction instructions for modifying them. These transaction instructions can assume many various forms. For example, such execution includes one or more of the deletion request entering a 'grace period' which encapsulates manual deletion protocol if said grace period was defined in the TOS, executing manual or automated forced deletion, and writing designated space with random data, and deleting overwritten designated space and the index reference to designated space. In one implementation, the grace period is seventy two (72) hours. In an alternative implementation, the grace period reflects the party's data retention policy.

An operation 316 receives delete confirmation. Specifically, in one implementation, the operation 316 receives the delete confirmation from all parties from the operation 304, including the UI client 120. An operation 318 determines the validity of the delete confirmation by a consensus of peer nodes. Subsequently, an operation 320 generates and uploads a hash with the delete confirmation to the DL.

Figure 4:
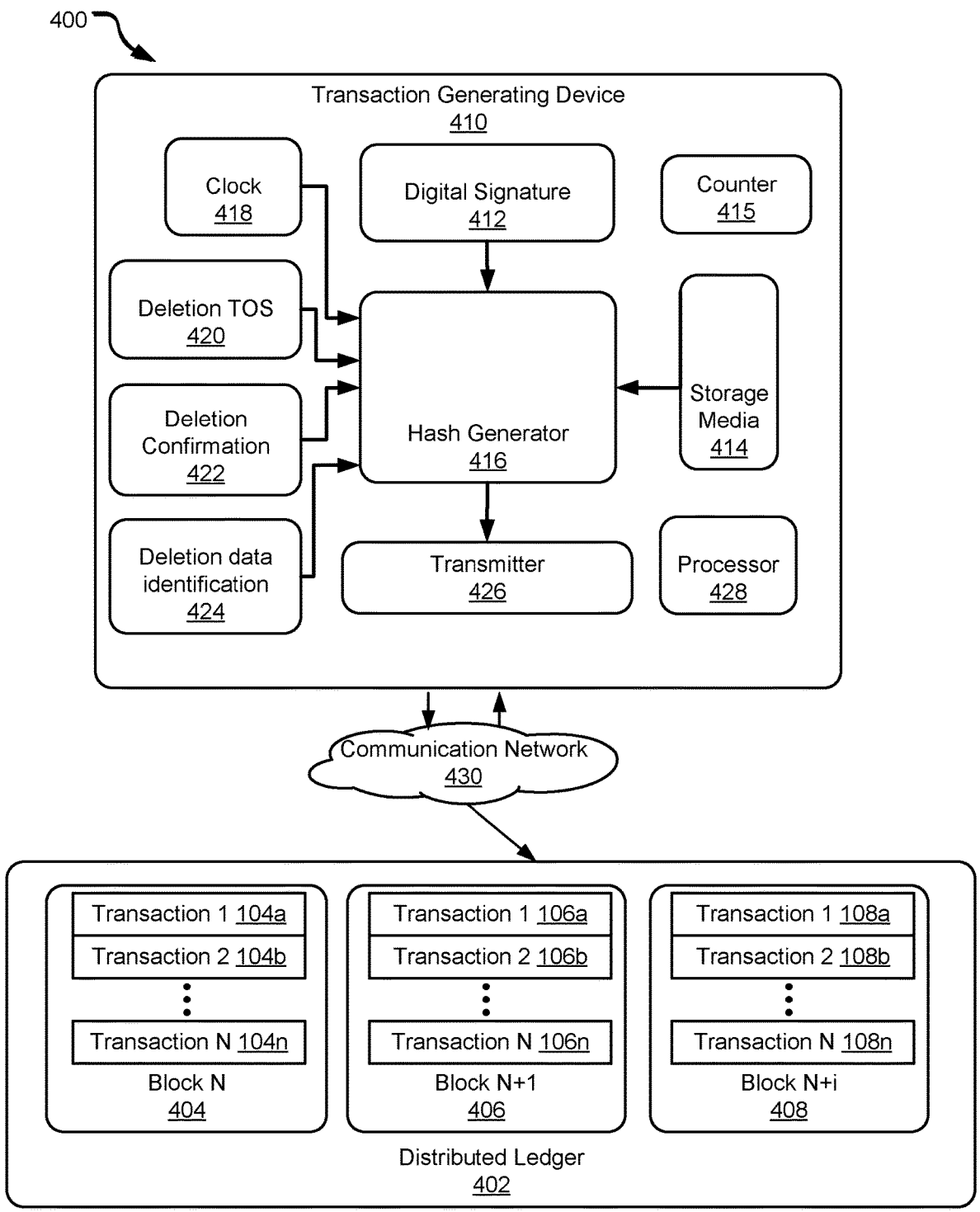
FIG. 4 illustrates a block diagram of a transaction generating node using the distributed ledger to store transactions related to deletion of information.

FIG. 4 illustrates a block diagram 400 of a transaction generating device 410 that may be used by various nodes on a DL network to generate transactions for storage on the DL network. The device 410 may be implemented using a computer systems executing processor executable instructions for supporting the DL 102. The device 410 may include a clock 418 that provides a time-stamp for a data deletion request and execution. A deletion ToS database 420 stores various contracts and ToS between the users of the IDAS. A deletion confirmation database 422 stores various deletion completion data. A deletion data identification store 424 stores the locations of data associated with the data deletion requests. A storage media 414 stores other data and programs that are used to implement the transaction generation and such programs may be executed by a processor 426. A hash generator 416 uses a digital signature 412, the clock data, the deletion ToS, deletion confirmation, etc., to generate hashes that are communicated to the DL 402 via the transmitter 426.

In one implementation, the system also provides baseline scaling of a third party C. The system disclosed herein is configured to handle the addition of more and more nodes and also to handle the removal of them. As a third party C is likely to scale at a minimum of N+1 on a DL, such as the DL 402, this allows an unbiased third party, such as the third party C, to always have at minimum the extra node of the DL so the users sharing and consuming data on the system cannot gain a statistical advantage over each other by accumulating and leveraging a majority stake in the nodes against another party with a smaller node base within the DL 402 and DL system for the purpose of attacks and/or hacking. Thus, a block 408 may be used by such third party C. Furthermore, a counter 415 may be provided to keep count of node ratios.

Figure 5:
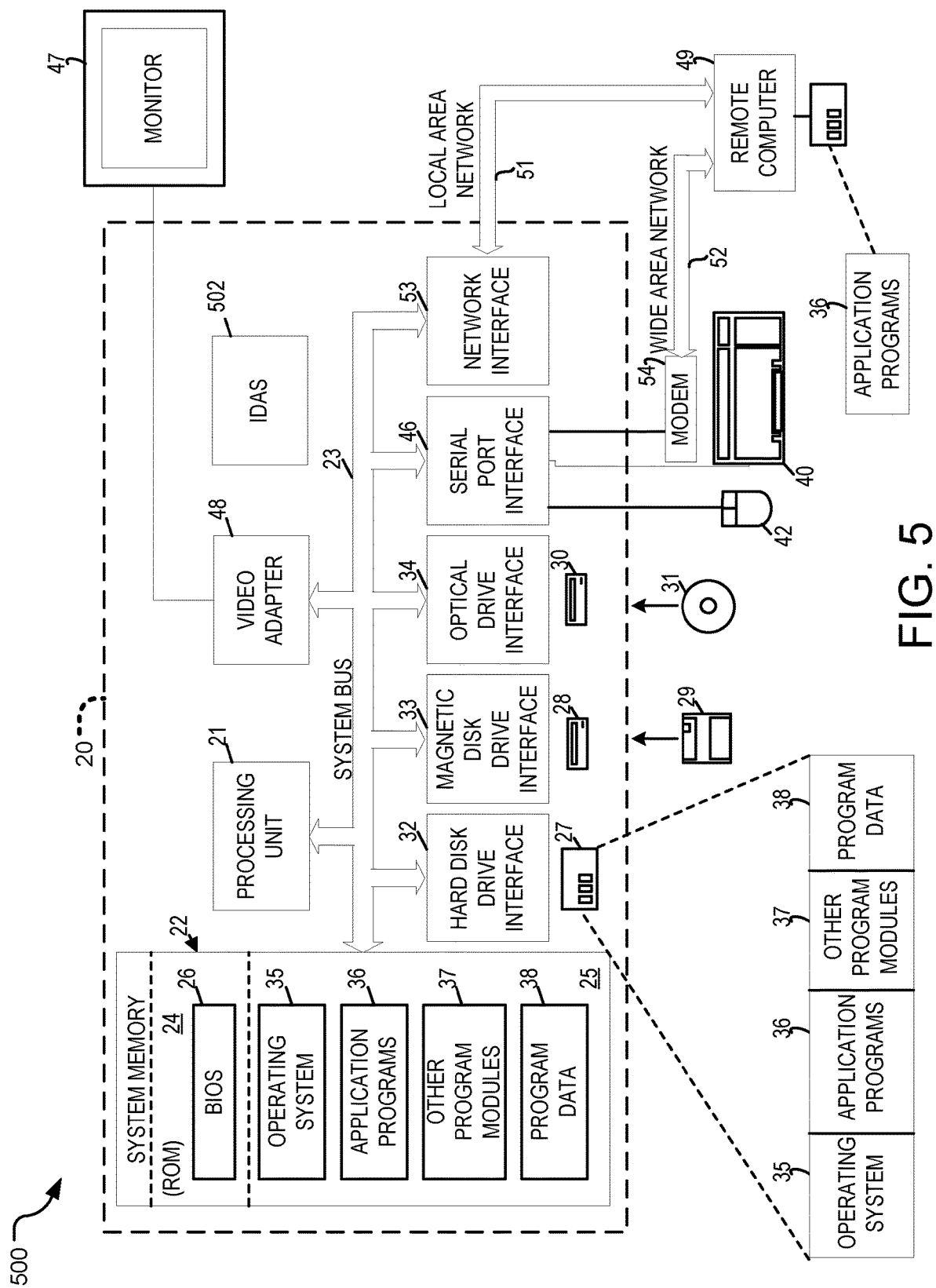
FIG. 5 illustrates an example computing system that may be used to implement the technology disclosed herein.
Figure 6A:
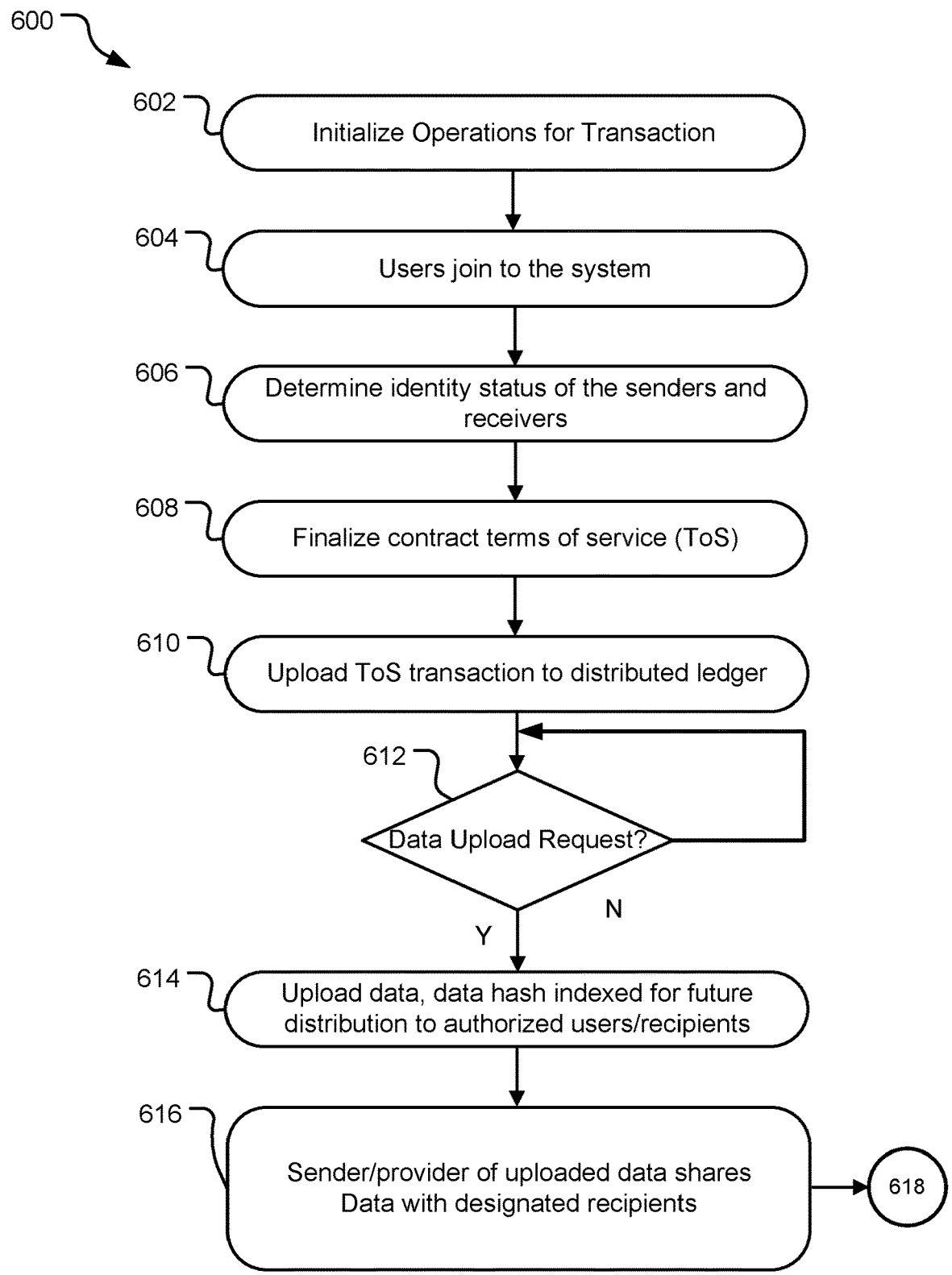
FIGS. 6A-6D illustrate example operations for an information deletion and disclosure assurance system (IDDAS) disclosed herein.
Figure 6B:
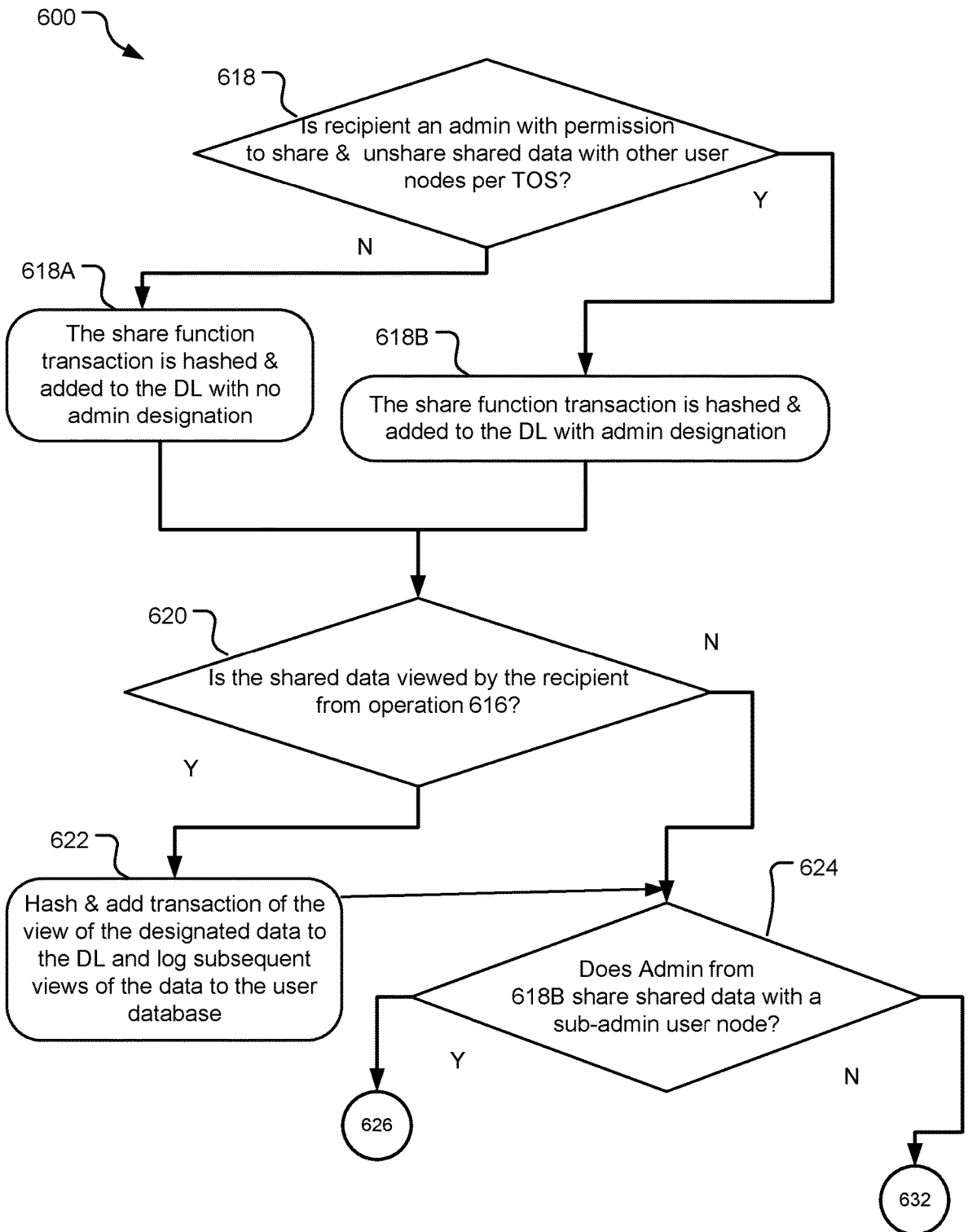
Figure 6C:
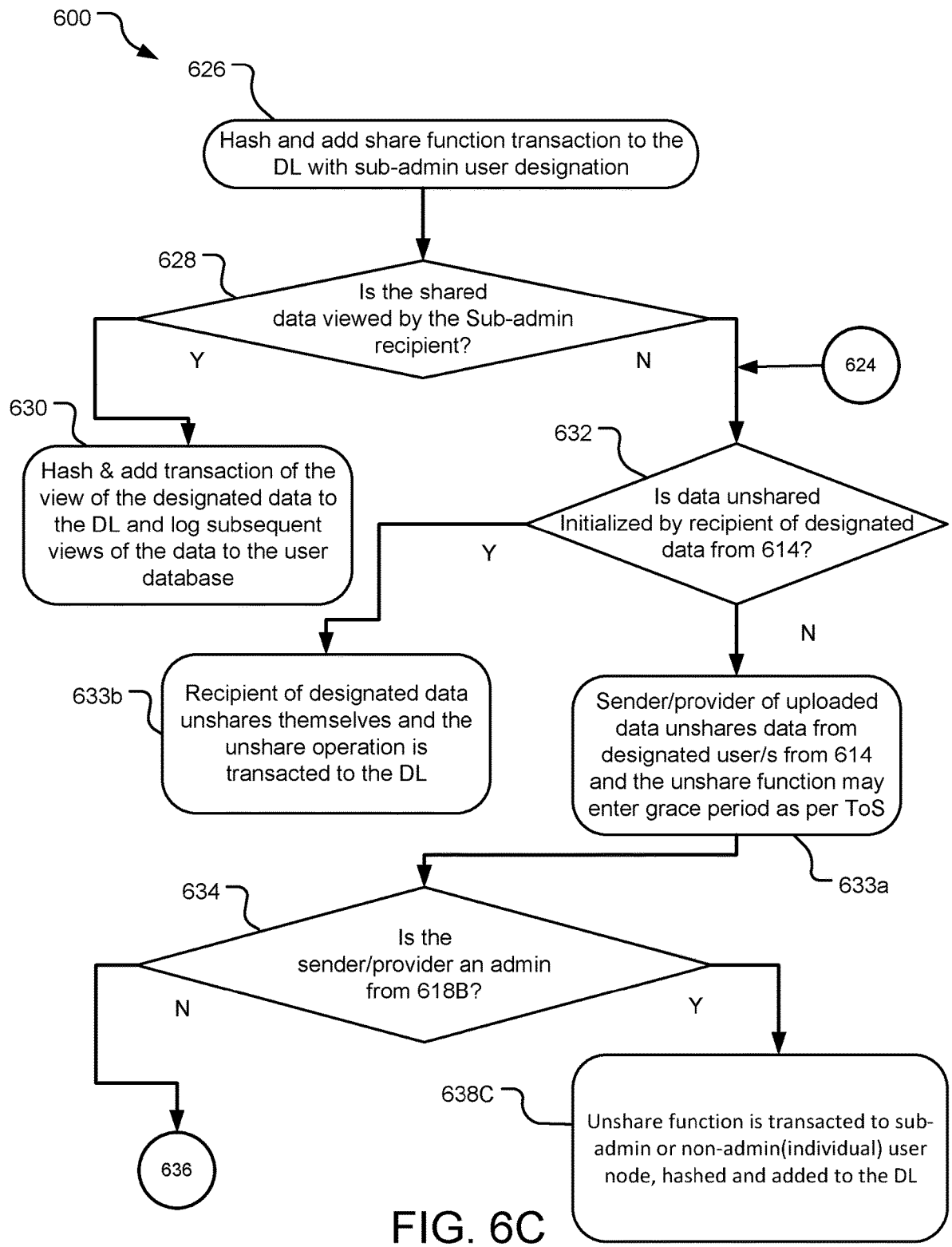
Figure 6D:
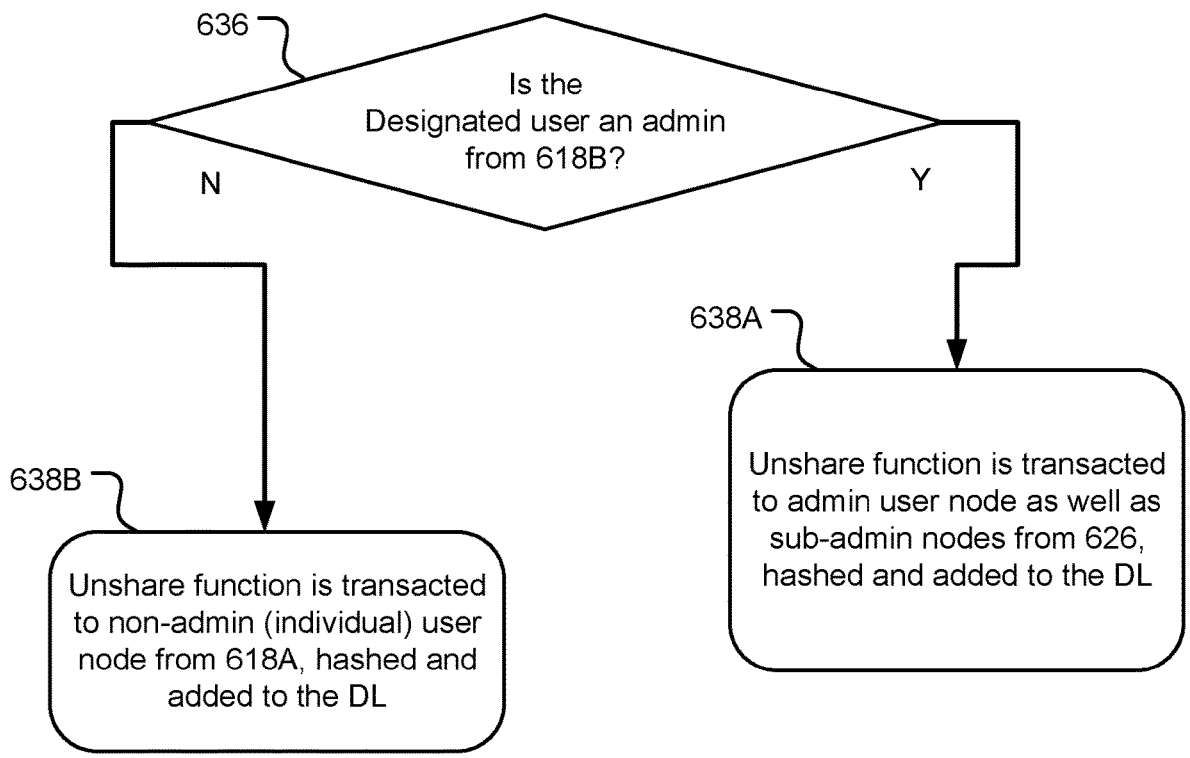

FIG. 5 illustrates an example system 500 that may be useful in implementing the information deletion assurance system disclosed herein. The example hardware and operating environment of FIG. 5 for implementing the described technology includes a computing device, such as general purpose computing device in the form of a gaming console or computer 20, a mobile telephone, a personal data assistant (PDA), a set top box, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central processing unit (CPU), or a plurality of processing units, commonly referred to as a parallel processing environment. The computer 20 may be a conventional computer, a distributed computer, or any other type of computer; the implementations are not so limited. An information deletion assurance system (IDAS) 502 may be implemented on the computer 20 to save code and to perform one or more operations of the technology disclosed herein.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 2. The logical connections depicted in FIG. 2 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

FIGS. 6A-6D illustrate example operations 600 for an information deletion and disclosure assurance system (IDDAS) disclosed herein. Specifically, the operations 600 allows generating and storing transactions on the DL in response to a party's viewing/downloading, sharing, or unsharing of one or more files. For example, a party A may disclose some content by sharing a file to a party B, and party B may subsequently share that shared data with a party D. Party C is the unbiased curator of the ledger transactions between parties A, B, and D. Data disclosure transactions conducted via operations 600 are saved on the DL.

Specifically, the operations 600 allow an implementation of an information disclosure and deletion assurance system (IDDAS) such that if a party A discloses content by sharing a document to another party, the sharing is transacted on the DL, as a share function. If the other party (recipient) views/downloads the content that has been shared a corresponding DL transaction is created. Subsequent views/downloads are pushed to the database for reference. Here, if the data is never viewed then the content is not a liability to the prospective alternative receiving party. The purpose of the IDAS is to lower an entity's/individual's legal liability for being responsible and accountable for the deletion of data to the lowest possible level. Because the upload function and existence of a file in storage that a permissioned recipient has been granted access to are linked by the share function the share function itself adds a level of nuance to the definition of the legal liability of what is means to "delete" the information.

The share/unshare function of the admin tools as provided herein creates a subset of "soft" deletion protocols (non-storage level overwrite) by simply removing a specific node's ability to access previously shared and viewed information. Furthermore, from the standpoint of a particular low level user node (employee of admin) the action of being unshared constitutes a "delete" for that node—A permissioned node had access to data and now they do not- and therefore the Share and Unshare functionality can be considered to define the parameters of "soft" deletion protocols. Thus, the share and unshare function combined with the view function all being transacted on the DL define a suite of tools to complete a "soft" delete. This is important to note as the IDAS is designed to assure that all node that receive permissioned information ultimately no longer have access to shared information.

These functions may be highly useful or advantageous to use over a "hard" delete in situations in which projects may go dormant and become resurgent among peer groups and B2B interactions in which the ability to "soft" delete data multiple times satisfies the legal definition of a delete for certain users/nodes but avoids a hard delete in which data being distributed is deleted from storage and which case is no longer viewable by any user or node within the ledger relationship and network. In the business case previously described of projects with unpredictable time lines this avoids the need to re-upload previous data, resign the ToS, etc., that would otherwise be required due to fully removed data via a hard delete to storage. Once the project is fully finished then a hard delete can be enacted as needed upon the termination of the entire business relationship of the participating entities.

As used in FIGS. 6A-6D, sub admin user node is a description within the user node groups that is defined by its relationship to a "Super Admin" (not disclosed herein). For example, a Super Admin may be defined as just an Admin. For example, a Super Admin may have the ability to share Shared data and Sub Admin may not. Alternatively, a Sub Admin may have the ability to view/consume shared data, but it may not have the ability to share Shared Data. This distinction is noted in FIGS. 6A-6D as its application in the unshare function is especially defined as it is needed in the realistic implementation of the Unshare function.

In the context of FIGS. 6A-6D, if an individual shares data with an enterprise/company it is understood (and legally defined within the ToS) that a data protection officer/super admin of that enterprise must share Shared data with lower level employee sub admin nodes to render the services provided and requested by the individual consumer user node both within the enterprise and within a reasonable range of B2B interactions. Thus, from a standpoint of the user experience, a chaincode must organize this as it is tedious and illogical for an individual user node to be forced to unshare what may be many users of a single file. Furthermore, if the super admin is Unshared all other nodes they shared data with that have been designated as sub admin are automatically unshared as well.

Now referring to FIGS. 6A-6D, an operation 602 initializes one or more operations for a transaction. Such initialization may include initialization via a web/browser based implementation or non-browser based application. One or more users, such as the users 111, may join the system at an operation 604. These users 111 may participate in the IDAS as senders and receivers of data, data requests, etc. An operation 606 determines the identity status of these senders and receivers. An operation 608 finalizes the contract and terms of service (ToS) between various senders and receivers. An operation 610 generates and uploads a ToS transaction to the DL. An operation 612 determines if a data upload request is received. Specifically, the operation 612 may relate the data upload request with the related ToS. If so, an operation 614 uploads the data and hash of the data indexed for future distribution to various nodes, such as nodes 104, 106 of the DL. Also, an operation 616 a sender or provider of the uploaded data shares the data with other designated recipients. For example, the designated recipients may be specified by username, email, users' computing device information, etc., or any other specified registration identification designated and assigned to registered users by the identity management apparatus within the networks' membership services application.

Subsequently, an operation 618 determines if the recipient of the data is an admin user with permissions to share and unshare data with other user nodes as per the ToS. If so, at operation 618B the share function transaction is hashed and added to the DL with admin designation. However, if not, at operation 618A, the share function transaction is hashed and added to the DL with no admin designation. Subsequently, an operation 620 determines if the shared data is viewed by one or more of the recipients with whom the data is shared with at the operation 616 above. If so, an operation 622 hashes and adds the transaction of the viewing of the designated data to the DL and logs any subsequent viewings of the data by the recipient to a user database. Specifically, such user database keeps logs of the viewings of data by various users.

If the operation 620 determines that the shared data is or is not viewed by a recipient from operation 616, an operation 624 determines if an admin from the operation 618B has shared the data with a sub-admin user node. If "yes," an operation 626 hashes and adds the share function transaction to the DL with sub-admin user designation. An operation 628 determines if the shared data is viewed by the sub-admin recipient. If "yes," an operation 630 hashes and adds the transaction of the viewing of the designated data to the DL and logs the subsequent viewings of the data by the sub-admin recipient to the user database.

However, if the determination by the operation 624 is "no" and the determination by the operation 628 is also "no," an operation 632 determines if a data unshare operation is initialized by a recipient of the data from the operation 614. If "yes," at operation 633b the recipient of designated data unshares themselves and the unshare operation is transacted to the DL. If "no," at operation 633a, a sender/provider of uploaded data unshares data from designated user/s from 614 and the unshare function may enter grace period as per the ToS.

Subsequently, an operation 634 determines if the sender/providers is an admin from operation 618B. If "yes," at operation 638C an unshare function is transacted to a sub-admin user node, hashed, and added to the DL. If "no," an operation 636 determines if the designated user is an admin from operation 618B. If "yes," at operation 638A an unshare function is transacted to an admin user node as well as to one or more sub-admin nodes from operation 626, hashed, and added to the DL. If "no," at operation 638B an unshare function is transacted to non-admin (individual) user node from operation 618A, hashed, and added to the DL.

In an example implementation, software or firmware instructions and data for providing a search management system, various applications, search context pipelines, search services, service, a local file index, a local or remote application content index, a provider API, a contextual application launcher, and other instructions and data may be stored in memory 22 and/or storage devices 29 or 31 and processed by the processing unit 21.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

Embodiments of the present technology are disclosed herein in the context of an electronic market system. In the above description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application- and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A computer implemented method of providing assurance related to data deletion, implemented by a plurality of computer readable instructions stored on a non-transitory computer readable medium and executable by a computer processor, the method comprising:
   generating a distributed ledger (DL) transaction based on a deletion terms of service (TOS) between a deletion assurance provider and designated users, the deletion TOS initiated prior to any occurrence of transfer/transaction between the designated users;
   subsequent to generating the DL transaction based on the deletion TOS and before any occurrence of data transfer/transaction between the designated users, validating the deletion TOS by a plurality of DL nodes;
   generating a hash of a designated space referenced by an index of future overwrite and/or deletion and storing the hash on a plurality of nodes of the DL;
   receiving a deletion request from one of the designated users;
   validating the deletion request's compliance with the deletion TOS;
   validating the deletion request by the plurality of DL nodes;
   initiating a deletion operation, wherein the deletion operation comprises overwriting the data before deleting the data;
   validating the deletion operation by the plurality of DL nodes; and
   generating a transaction including validation of the deletion operation.

2. The method of claim 1, wherein validating the deletion request by the plurality of DL nodes further comprising broadcasting the deletion request to the plurality of DL nodes.

3. The method of claim 2, wherein validating the deletion operation further comprising validating a delete confirmation.

4. The method of claim 1, further comprising storing the locations of the data associates associated with the deletion request.

5. The method of claim 4, wherein generating a transaction including validation of the deletion operation further comprising generating the transaction including deletion TOS, clock data, and the delete confirmation.

6. The method of claim 1, further comprising generating a share/unshare DL transaction in response to sharing, or unsharing of data subject to the deletion TOS.

7. The method of claim 6, wherein generating the share/unshare DL transaction further comprising generating the share DL transaction including admin designation of a party sharing, or unsharing of data subject to the deletion TOS.

8. The method of claim 7, wherein generating the share DL transaction further comprising generating the share DL transaction including identity of a recipient of the data subject of the deletion TOS.

9. The method of claim 1, further comprising generating a view DL transaction in response to viewing of data subject to the deletion TOS.

10. The method of claim 9, wherein generating the view DL transaction further comprising generating the view DL transaction including admin designation of a party viewing the data subject to the deletion TOS.

11. The method of claim 1, wherein the deletion operation further comprising overwriting the data and then deleting that overwritten data and wherein validating the deletion operation further comprising validating the overwriting the data and then deleting that overwritten data.

12. The method of claim 1, wherein generating a transaction including validation of the deletion operation further comprises generating a hash of metadata generated by the deletion transactions to specify and differentiate deletion requests from other transactions.

13. A method implemented using a computing device, the method comprising:
  initiating a deletion terms of service (TOS) between a deletion assurance provider and designated users prior to any occurrence of data transfer/transaction between the designated users;
  receiving, at a deletion assurance user interface (UI) client implemented on a server, the deletion TOS
  generating a distributed ledger (DL) transaction based on the deletion TOS between the deletion assurance provider and the designated users;
  subsequent to generating the DL transaction based on the deletion TOS and before any occurrence of data transfer/transaction between the designated users, validating the deletion TOS by a plurality of DL nodes;
  generating a hash of a designated space referenced by an index of future overwrite and/or deletion and storing the hash on a plurality of nodes of the DL;
  receiving, at the deletion assurance UI client, a deletion request from one of the designated users for deletion of data;
  validating the deletion request's compliance with the deletion TOS;
  validating the deletion request by the plurality of DL nodes;
  initiating a deletion operation, wherein the deletion operation comprises overwriting the data before deleting the data;
  validating the deletion operation by the plurality of DL nodes; and
  generating a transaction including validation of the deletion operation.

14. The method of claim 13, wherein validating the deletion request by the plurality of DL nodes further comprising broadcasting the deletion request to the plurality of DL nodes.

15. The method of claim 14, wherein validating the deletion operation further comprising validating a delete confirmation.

16. The method of claim 13, generating a transaction including validation of the deletion operation further comprising generating a hash of metadata generated by the deletion transactions to specify and differentiate deletion requests from other transactions.

17. The method of claim 13, further comprising generating a share/unshare DL transaction in response to sharing, or unsharing of data subject to the deletion TOS.

18. The method of claim 17, further comprising generating the share/unshare DL transaction further comprising generating the share DL transaction including admin designation of a party sharing, or unsharing of data subject to the deletion TOS.

19. The method of claim 18, wherein generating the share DL transaction further comprising generating the share DL transaction including identity of a recipient of the data subject to the deletion TOS.

20. A computer implemented method of providing assurance related to data deletion, implemented by a plurality of computer readable instructions stored on a non-transitory computer readable medium and executable by a computer processor, the method comprising:
  generating a distributed ledger (DL) transaction based on a deletion terms of service (TOS) between a deletion assurance provider and designated users, the deletion TOS initiated prior to any occurrence of data transfer/transaction between the designated users;
  subsequent to generating the DL transaction based on the deletion TOS and before any occurrence of data transfer/transaction between the designated users, validating the deletion TOS by a plurality of DL nodes;
  receiving a data upload request and in response, uploading the data and a hash of the data indexed for future overwrite and/or deletion to various nodes;
  generating a hash of a designated space referenced by the index of future overwrite and/or deletion;
  storing the hash on a plurality of nodes of the DL;
  receiving a deletion request from one of the designated users;
  validating the deletion request's compliance with the deletion TOS;
  validating the deletion request by the plurality of DL nodes;
  initiating a deletion operation, wherein the deletion operation comprises overwriting the data before deleting the data;
  validating the deletion operation by the plurality of DL nodes; and
  generating a transaction including validation of the deletion operation.

* * * * *